United States Patent
Lai et al.

(10) Patent No.: US 9,625,793 B1
(45) Date of Patent: Apr. 18, 2017

(54) MOUNTING APPARATUS FOR POSITION-RETAINING CAMERA

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Cheng-Yi Lai, New Taipei (TW); Tzu-Hsiu Hung, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/185,248

(22) Filed: Jun. 17, 2016

(30) Foreign Application Priority Data

May 24, 2016 (TW) .............................. 105116075 A

(51) Int. Cl.
  *G03B 17/56* (2006.01)
  *H04N 5/225* (2006.01)
  *G03B 17/02* (2006.01)

(52) U.S. Cl.
  CPC ........... *G03B 17/561* (2013.01); *G03B 17/02* (2013.01); *H04N 5/2252* (2013.01)

(58) Field of Classification Search
  None
  See application file for complete search history.

(56) References Cited

U.S. PATENT DOCUMENTS

| | | | |
|---|---|---|---|
| 6,181,381 B1 * | 1/2001 | Evans .................. | G06F 1/1622 348/333.01 |
| 8,134,638 B2 * | 3/2012 | Wang ................... | G06F 1/1616 348/373 |
| 2008/0159712 A1 | 7/2008 | Hayashi et al. | |
| 2013/0250141 A1 * | 9/2013 | Nakamura ............. | B60R 11/02 348/231.7 |
| 2014/0321039 A1 * | 10/2014 | Quijano ............... | G06F 1/1601 361/679.22 |

FOREIGN PATENT DOCUMENTS

| | | |
|---|---|---|
| CN | 2840601 | 11/2006 |
| CN | 103189823 | 3/2016 |
| GB | 2384611 | 7/2003 |
| TW | 467297 | 12/2001 |
| TW | 581362 | 3/2004 |
| TW | 201511555 | 3/2015 |

\* cited by examiner

*Primary Examiner* — William Perkey
(74) *Attorney, Agent, or Firm* — Zhigang Ma

(57) ABSTRACT

A mounting apparatus, able to maintain the relative position of a camera during rotations between portrait and landscape presentations of an electronic device, includes a camera. The mounting apparatus is mounted to an electronic device, which has a display screen. When the electronic device is rotated from a first presentation state to a second presentation state, the camera remains in position above the display screen.

20 Claims, 5 Drawing Sheets

MOUNTING APPARATUS FOR POSITION-RETAINING CAMERA

CROSS-REFERENCE TO RELATED APPLICATIONS

This application claims priority to Taiwan Patent Application No. 105116075, filed on May 24, 2016, the contents of which are incorporated by reference herein.

FIELD

The subject matter herein generally relates to camera mountings.

BACKGROUND

Cameras are mounted above display screens of electronic devices, for example computers, to capture images. When the electronic device rotates from a vertical screen mode to a landscape mode, the existing camera rotates from a position above the display screen to a position on the left or on the right of the display screen.

BRIEF DESCRIPTION OF THE DRAWINGS

Implementations of the present technology will now be described, by way of example only, with reference to the attached figures.

DETAILED DESCRIPTION

Figure 1:
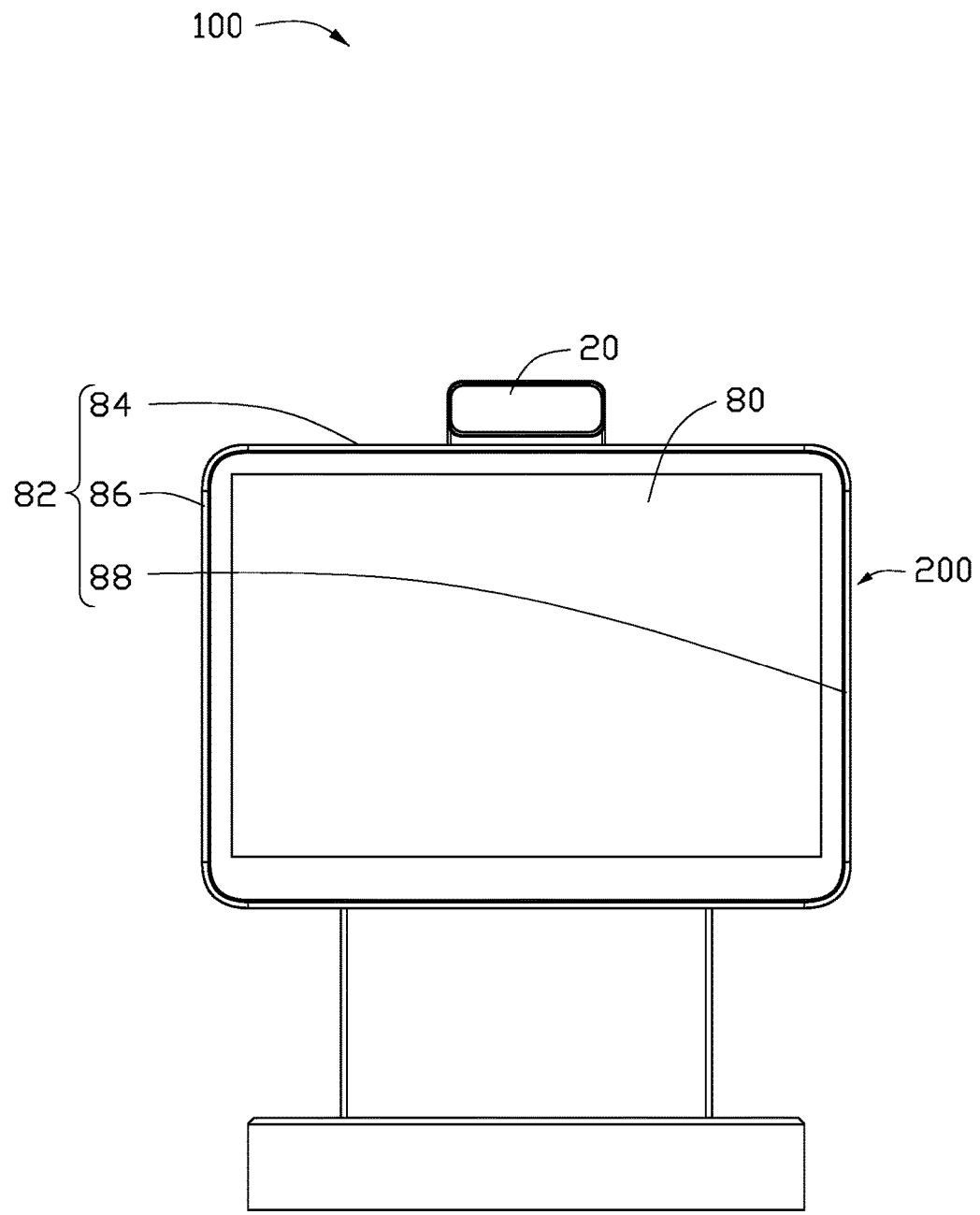
FIG. 1 is a front view of a camera mounting apparatus mounted on an electronic device in a first state.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to"; it specifically indicates open-ended inclusion or membership in a so-described combination, group, series, and the like.

Figure 2:
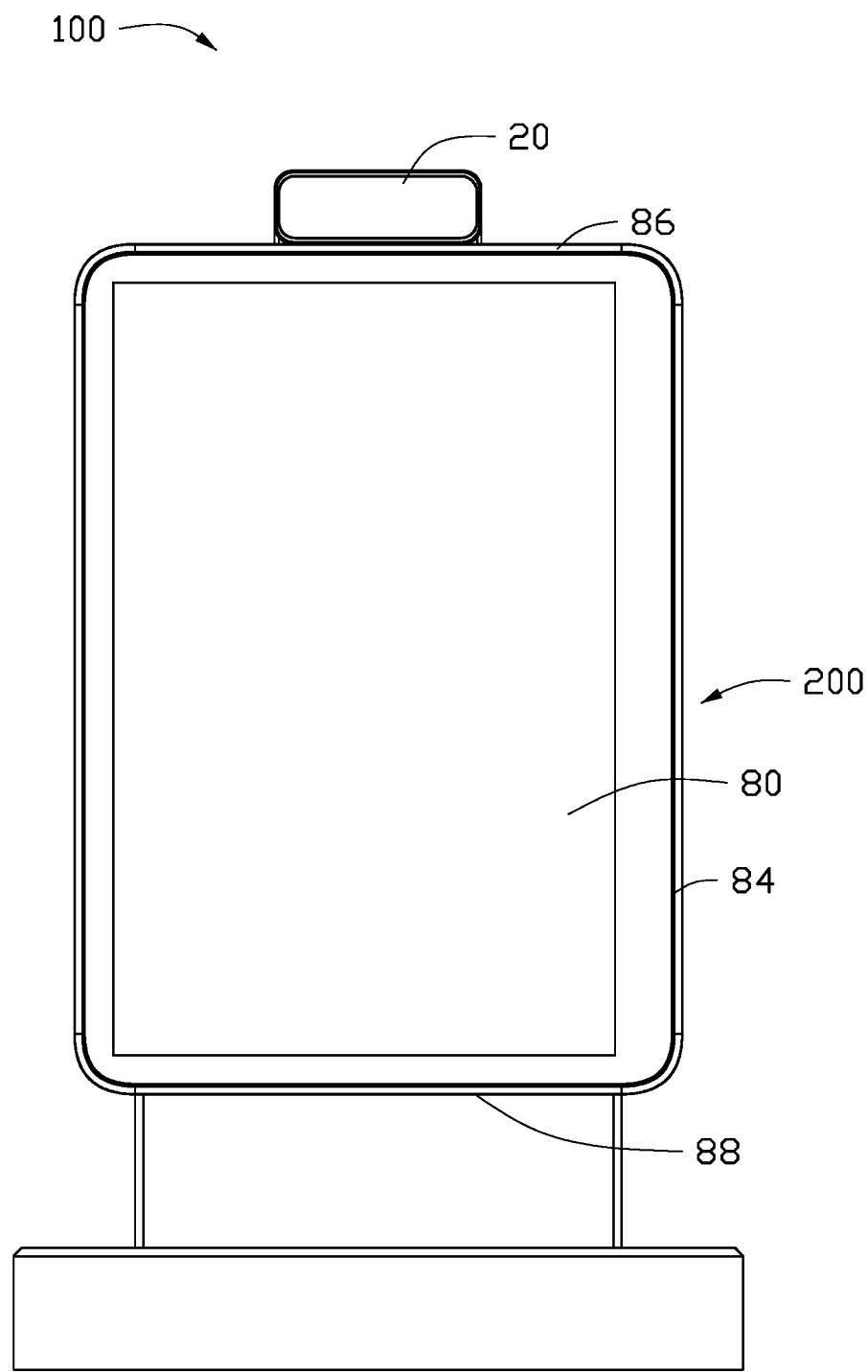
FIG. 2 is similar to FIG. 1, the electronic device being in a second state.

FIGS. 1 and 2 illustrate a camera mounting apparatus 100 mounted to an electronic device 200, the electronic device 200 including a display screen 80. The camera mounting apparatus 100 includes a camera 20 for capture images. When the electronic device 200 rotates from an exemplary first placement state as in FIG. 1 to an exemplary second placement state as in FIG. 2, the camera 20 remains in position above the display screen 80 even though the display screen 80 has been rotated to the left side or the right side for ninety degrees.

Figure 3:
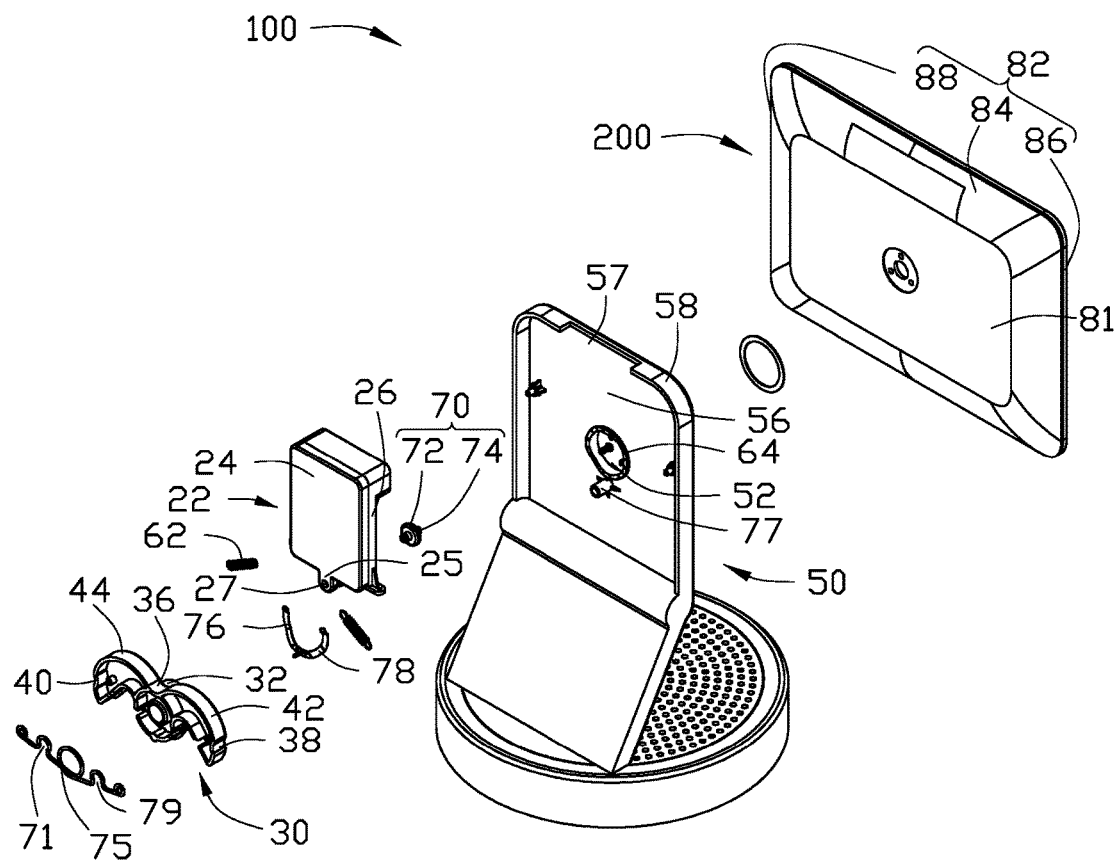
FIG. 3 is an exploded view of the camera mounting apparatus shown in FIG. 1.
Figure 4:
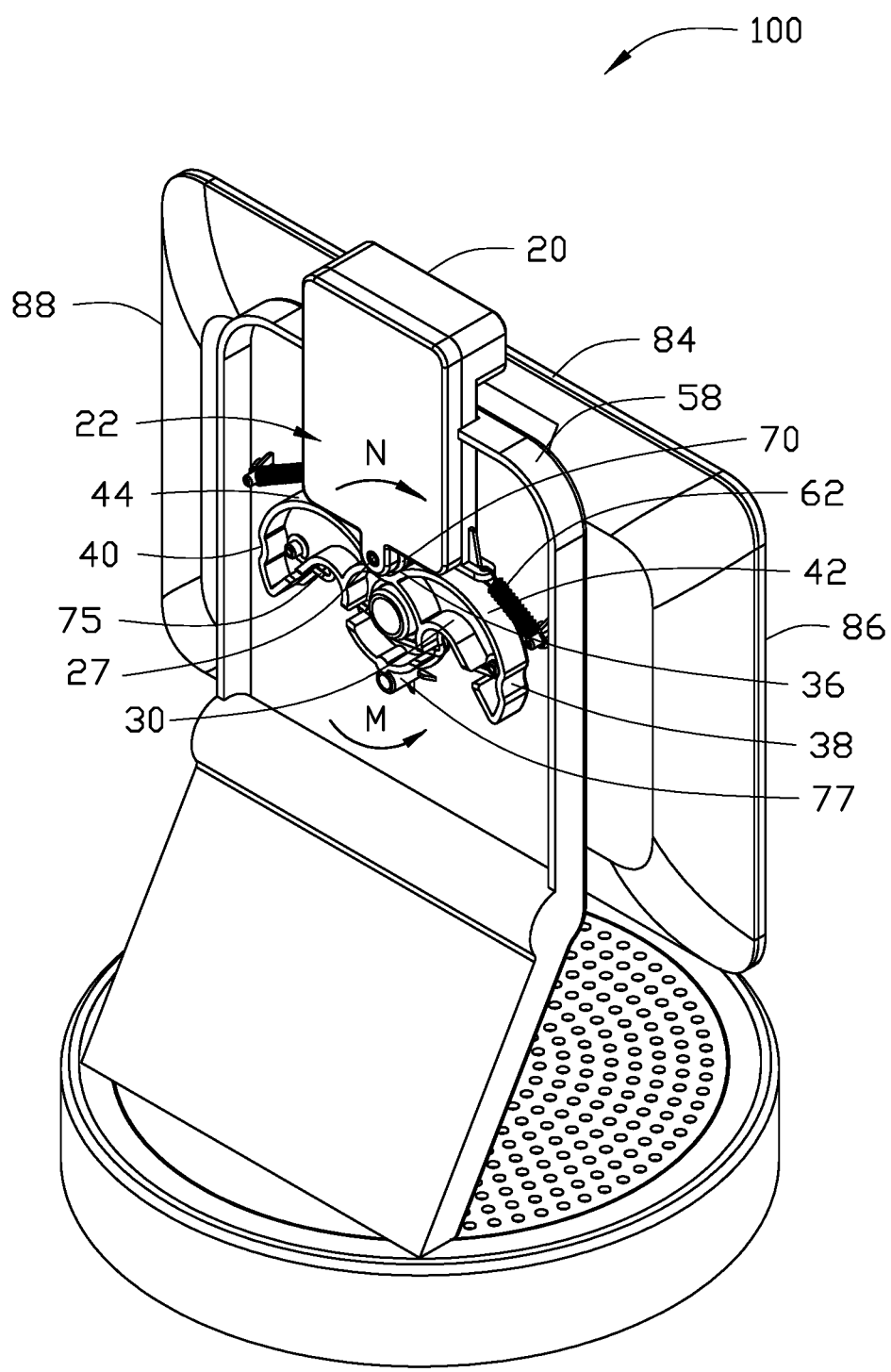
FIG. 4 is a perspective view of the camera mounting apparatus shown in FIG. 1., with a rear cover omitted.
Figure 5:
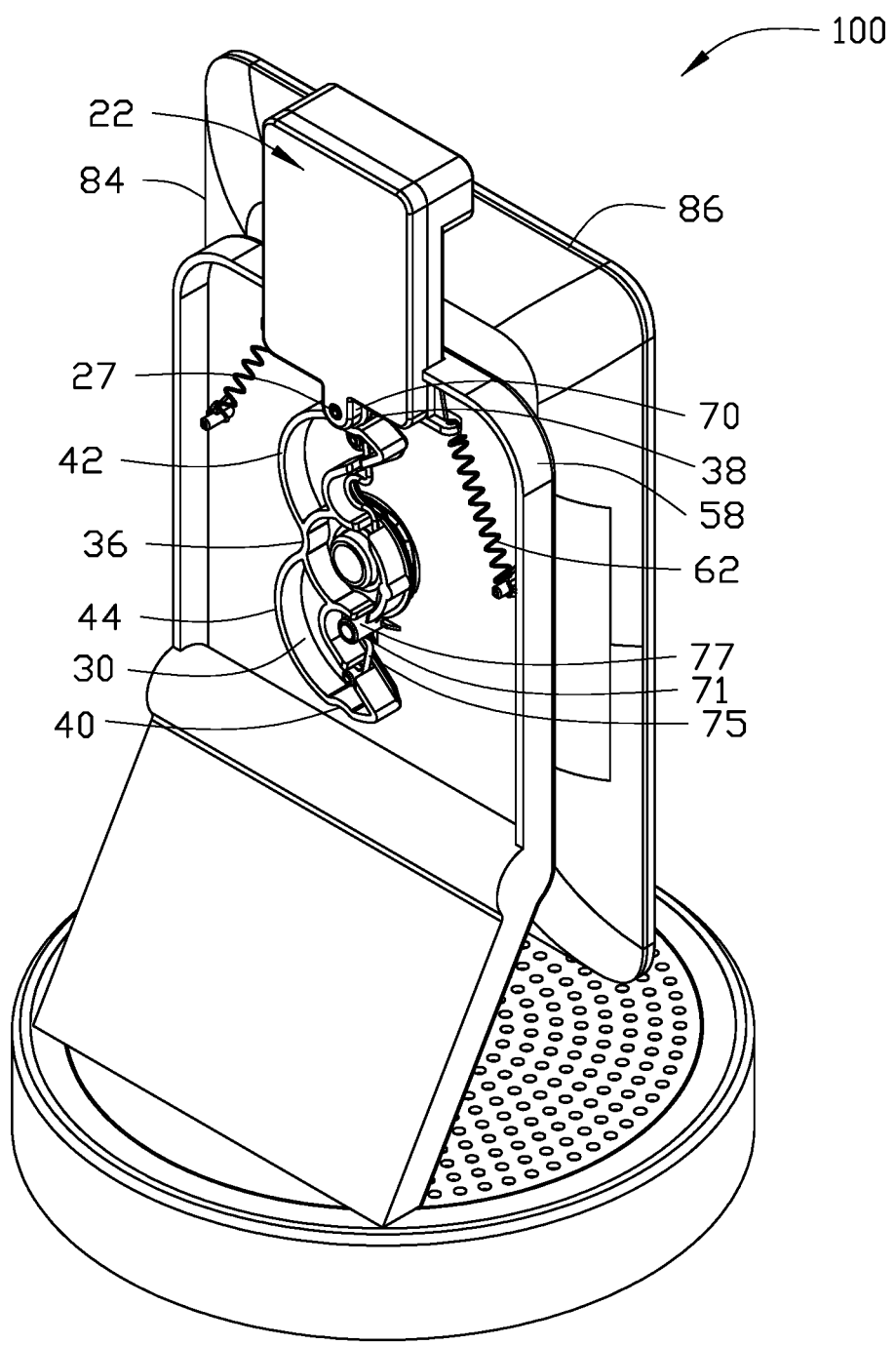
FIG. 5 is a perspective view of the camera mounting apparatus shown in FIG. 2., with the rear cover omitted.

The electronic device 200 further includes a frame 82 surrounding the display screen 80. The frame 82 includes a first wall 84, a second wall 86 and a third wall 88. The second wall 86 and the third wall 88 are attached to two ends of the first wall 84. FIGS. 3 to 5 illustrate that the camera mounting apparatus 100 further includes a housing 22 for receiving the camera 20, a rotatable member 30, and a fastening member 50. The rotatable member 30 is rotatably attached to the fastening member 50 and is mounted to the electronic device 200. When the electronic device 200 is rotated, the rotatable member 30 and the electronic device 200 both rotate relatively to the fastening member 50. The rotatable member 30 includes a shaft 32. The fastening member 50 defines a shaft hole 52. The shaft 32 is rotatably received in the shaft hole 52 and is mounted to the electronic device 200. The shaft 32 and a rear shell 81 of the electronic device 200 define a number of first fixing holes (not labeled) and a number of second fixing holes (not labeled) aligned with the first fixing holes. A number of screws are screwed in the first fixing holes and the second fixing holes to mount the rotatable member 30 to the electronic device 200. In another embodiment, the shaft 32 is magnetic. A part of the rear shell 81 facing the shaft 32 is also magnetic. The shaft 32 and the rear shell 81 are attracted to each other by magnetic force to mount the rotatable member 30 to the electronic device 200.

The rotatable member 30 defines a first location groove 36, a second location groove 38, and a third location groove 40. The second location groove 38 and the third location groove 40 are located at two sides of the first location groove 36. The rotatable member 30 includes a first rail 42 connected to the first location groove 36 and the second location groove 38, and a second rail 44 connected to the first location groove 36 and the third location groove 40. The first rail 42 and the second rail 44 have arced surfaces. A length of the first wall 84 is greater than that of the second wall 86 and the third wall 88. The arced surfaces protrude toward the camera 20.

The fastening member 50 includes a front cover 58 and a rear cover (not shown). The front cover 58 is mounted to the rear cover to form a receiving space 56. An end of the front cover 58 defines a gap 57. The gap 57 is in air communication with the receiving space 56. The housing 22 is received in the receiving space 56 and slides in the gap 57.

A rolling member 70 is mounted to an end of the housing 22 away from the camera 20. The housing 22 includes a first shell 24 and a second shell 26 mounted to the first shell 24. Two protrusion pieces 25 respectively extend from an end of the first shell 24 and an end of the second shell 26 away from the camera 20. Each protrusion piece 25 defines a through hole 27. In FIG. 1, the rolling member 70 includes a wheel 72 and a fastening shaft 74 passing through the wheel 72. The fastening shaft 74 is received in the two through holes 27. The wheel 72 is positioned between the two protrusion pieces 25. The wheel 72 can roll on the fastening shaft 74.

In an exemplary embodiment as shown in FIG. 4, when the first wall 84 is horizontal, the rolling member 70 locks in the first location groove 36 and the camera 20 is thereby positioned above the first wall 84. In FIG. 4, when the electronic device 200 is rotated in a first direction M in the plane of the display screen 80, the rolling member 70 rolls along the first rail 42 to drive the housing 22 to slide in a direction perpendicular in the gap 57. The electronic device 200 can be rotated until the first wall 84 is vertical as shown in FIG. 5, the rolling member 70 is then locked in the second location groove 38. The camera 20 is thereby positioned above the second wall 86, the second wall 86 now being horizontal.

In another exemplary embodiment, when the first wall 84 is horizontal and the electronic device 200 is rotated in a second direction N which is the opposite of the first direction in the plane of the display screen 80, the rolling member 70 rolls along the second rail 44 to drive the housing 22 to slide in a direction perpendicular in the gap 57. The electronic device 200 can be rotated until the first wall 84 is again vertical, however, the first wall 84 in the instant embodiment is substantially rotated to another direction with respect to the camera 20, the rolling member 70 is then locked in the third location groove 40 and the camera 20 being positioned above the now-horizontal third wall 88.

The second wall 86 and the third wall 88 are connected and are perpendicular to the first wall 84. The second location groove 38 and the third location groove 40 are symmetrically positioned on two sides of the first location groove 36. A plan view of the respective centers of the first, second, and third location grooves 36, 38, and 40 reveals an isosceles triangle. When the first wall 84 is parallel to the horizontal plane, the camera 20 is positioned above the first wall 84. When the electronic device 200 rotates 90 degrees toward the first direction M, the camera 20 is positioned above the second wall 86. When the electronic device 200 rotates 90 degrees toward the second direction N, the camera 20 is positioned above the third wall 88.

The camera mounting apparatus 100 further includes two tension springs 62. The ends of the two tension springs 62 are mounted at opposite sides of the housing 22, and the other ends of the two tension springs 62 are mounted to the fastening member 50. When a user rotates the electronic device 200, the two tension springs 62 provide resistance and feedback as to the location of the housing 22.

In FIG. 3, the front cover 58 forms a number of first beveled protrusions 64 surrounding the shaft hole 52. The camera mounting apparatus 100 further includes a leaf spring 76. The leaf spring 76 includes a number of second beveled protrusions 78 substantially matching the shapes of the first beveled protrusions 64. The leaf spring 76 is mounted to the rotatable member 30 and surrounds the rotation shaft 32. The second beveled protrusions 78 abut the first beveled protrusions 64. When the rotatable member 30 rotates following the electronic device 200, the second beveled protrusions 78 provide resistance to prevent unwanted rotations by the electronic device 200.

A number of fastening pillars (not labeled) are mounted to a side of the rotatable member 30 away from the rotation shaft 32. The camera mounting apparatus 100 further includes a wire spring 75. The wire spring 75 defines a number of installing holes (not labeled). The fastening pillars are received in the installing holes to fix the wire spring 75 to the rotatable member 30. The wire spring 75 further defines a first restriction groove 71 and a second restriction groove 79. The first restriction groove 71 and the second restriction groove 79 are symmetrically positioned at two sides of the rotation shaft 32. The first restriction groove 71 is positioned at a side of the rotation shaft 32 away from the second location groove 38. The second restriction groove 79 is positioned at a side of the rotation shaft 32 away from the third location groove 40. The front cover 58 includes a location pillar 77 positioned below the shaft hole 52. When the rolling member 70 locks in the second location groove 38 as shown in FIG. 5, the location pillar 77 is received in the first restriction groove 71 and the wire spring 75 prevents the rotation of the rotatable member 30. Similarly, when the rolling member 70 locks in the third location groove 40, the location pillar 77 is received in the second restriction groove 79 and the wire spring 75 prevents the rotation of the rotatable member 30.

The embodiments shown and described above are only examples. Even though numerous descriptions and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims.

What is claimed is:

1. A camera mounting apparatus mounted to an electronic device comprising a display screen and a frame, wherein the frame surrounds the display screen and comprises a first wall and a second wall positioned at one end of the first wall, the camera mounting apparatus comprising:
   a camera;
   a housing, the camera mounted in the housing and the housing comprising a rolling member mounted at an end thereof away from the camera;
   a fastening member, an end of the fastening member defining a gap and a receiving space in air communication with the gap, the housing received in the receiving space and slidable in the gap; and
   a rotatable member rotatably attached to the fastening member and mounted to the electronic device, the rotatable member defining a first location groove and a second location groove, and the rotatable member comprising a first rail connected to the first location groove and the second location groove;
   wherein when the electronic device rotates, the rotatable member and the electronic device both rotate relatively to the fastening member; wherein when the first wall is parallel to a horizontal plane, the rolling member locks in the first location groove and the camera is positioned above the first wall; wherein when the electronic device rotates toward a first direction in the plane of the display screen, the rolling member rolls along the first rail and drive the housing to slide along a direction perpendicular to a horizontal plane in the gap; wherein when the electronic device rotates the second wall to be in parallel with the horizontal plane, the rolling member locks in the second location groove and the camera is positioned above the second wall.

2. The camera mounting apparatus as claimed in claim 1, wherein the rotatable member further defines a third location groove, the second location groove and the third location groove are located at two sides of the first location groove, the rotatable member further comprises a second rail connected the first location groove and the third location groove, the frame further comprises a third wall positioned at another end of the first wall; wherein when the first wall is parallel to the horizontal plane and the electronic device rotates toward a second direction opposite to the first direction in the plane of the display screen, the rolling member rolls along the second rail and drives the housing to slide along a direction perpendicular to the horizontal plane in the gap.

3. The camera mounting apparatus as claimed in claim 2, wherein when the electronic device rotates and the third wall is parallel to the horizontal plane, the rolling member locks in the third location groove and the camera is positioned above the third wall.

4. The camera mounting apparatus as claimed in claim 3, wherein the third wall is perpendicularly connected to the first wall, when the first wall is parallel to the horizontal plane, the camera is positioned above the first wall, and when the electronic device rotates 90 degrees toward the second direction, the camera is positioned above the third wall.

5. The camera mounting apparatus as claimed in claim 1, wherein the second wall is perpendicularly connected to the first wall, when the first wall is parallel to the horizontal plane, the camera is positioned above the first wall, and when the electronic device rotates 90 degrees toward the first direction, the camera is positioned above the second wall.

6. The camera mounting apparatus as claimed in claim 1, wherein a length of the first wall is greater than the second wall, the first rail has an arced surface, and the arced surface protrudes toward the camera.

7. The camera mounting apparatus as claimed in claim 1, wherein the camera mounting apparatus further comprises two tension springs, one end of the two tension springs are mounted to two opposite sides of the housing, and another end of the two tension springs are mounted to the fastening member.

8. The camera mounting apparatus as claimed in claim 7, wherein two tension springs are symmetrically mounted to the two opposite sides of the housing.

9. The camera mounting apparatus as claimed in claim 1, wherein the housing defines two through holes, the rolling member comprises a wheel and a fastening shaft passing through the wheel, the fastening shaft is received on the two through holes, and the wheel is positioned between the two through holes.

10. The camera mounting apparatus as claimed in claim 1, wherein the camera mounting apparatus further comprises a wire spring mounted to the rotatable member, the wire spring defines a first restriction groove, and when the rolling member locks in the second location groove, the location pillar is received in the first restriction groove and is blocked by the wire spring.

11. A camera mounting apparatus mounted to an electronic device comprising a display screen and a frame, wherein the frame surrounds the display screen and comprises a first wall and a second wall positioned at an end of the first wall, the camera mounting apparatus comprising:
  a camera;
  a housing, the camera mounted in the housing and the housing comprising a rolling member mounted at an end thereof away from the camera;
  a fastening member, an end of the fastening member defining a gap and a receiving space in air communication with the gap, the housing received in the receiving space and slidable in the gap; and
  a rotatable member rotatably attached to the fastening member and mounted to the electronic device, when the electronic device rotates, the rotatable member and the electronic device both rotate relate to the fastening member, the rotatable member defining a first location groove and a second location groove, the rotatable member comprising a first rail connected the first location groove and the second location groove;
  wherein when the display screen is in a landscape mode, the rolling member locks in the first location groove and the camera is positioned above the first wall, wherein when the electronic device rotates toward a first direction in the plane of the display screen, the rolling member rolls along the first rail and drive the housing to slide along a direction perpendicular to a horizontal plane in the gap; wherein when the electronic device rotates to the display screen in a vertical screen mode, the rolling member locks in the second location groove and the camera is positioned above the second wall.

12. The camera mounting apparatus as claimed in claim 11, wherein the rotatable member further defines a third location groove, the second location groove and the third location groove are located at two sides of the first location groove, the rotatable member further comprises a second rail connected the first location groove and the third location groove, the frame further comprises a third wall positioned at another end of the first wall, wherein when the display screen is in the landscape mode and the electronic device rotates toward a second direction opposite to the first direction in the plane of the display screen, the rolling member rolls along the second rail and drive the housing to slide along a direction perpendicular to the horizontal plane in the gap.

13. The camera mounting apparatus as claimed in claim 12, wherein when the electronic device rotates toward the second direction to the vertical screen mode, the rolling member locks in the third location groove and the camera is positioned above the third wall.

14. The camera mounting apparatus as claimed in claim 13, wherein the third wall is perpendicularly connected to the first wall, when the first wall is parallel to the horizontal plane, the camera is positioned above the first wall, and when the electronic device rotates 90 degrees toward the second direction, the camera is positioned above the third wall.

15. The camera mounting apparatus as claimed in claim 11, wherein the second wall is perpendicularly connected to the first wall, when the first wall is parallel to the horizontal plane, the camera is positioned above the first wall, and when the electronic device rotates 90 degrees toward the first direction, the camera is positioned above the second wall.

16. The camera mounting apparatus as claimed in claim 11, wherein a length of the first wall is greater than the second wall, the first rail has an arced surface, and the arced surface protrudes toward the camera.

17. The camera mounting apparatus as claimed in claim 11, wherein the camera mounting apparatus further comprises two tension springs, one end of the two tension springs are mounted to two opposite sides of the housing, and another end of the two tension springs are mounted to the fastening member.

18. The camera mounting apparatus as claimed in claim 17, wherein two tension springs are symmetrically mounted to the two opposite sides of the housing.

19. The camera mounting apparatus as claimed in claim 11, wherein the housing defines two through holes, the rolling member comprises a wheel and a fastening shaft passing through the wheel, the fastening shaft is received on the two through holes, and the wheel is positioned between the two through holes.

20. The camera mounting apparatus as claimed in claim 11, wherein the camera mounting apparatus further comprises a wire spring mounted to the rotatable member, the wire spring defines a first restriction groove, and when the rolling member locks in the second location groove, the location pillar is received in the first restriction groove and is blocked by the wire spring.

* * * * *